United States Patent

Ono et al.

Patent Number: 6,140,404
Date of Patent: Oct. 31, 2000

[54] NON-LINEAR OPTICAL MATERIAL AND PROCESS FOR THE PREPARATION THEREOF

[75] Inventors: Yoshiyuki Ono; Katsuhiro Sato, both of Minami Ashigara, Japan

[73] Assignee: Fuji Xerox Co., Ltd., Tokyo, Japan

[21] Appl. No.: 08/762,942

[22] Filed: Dec. 10, 1996

[30] Foreign Application Priority Data

Dec. 15, 1995 [JP] Japan ................................ 7-326913

[51] Int. Cl.$^7$ .............................. C08J 5/10; C08K 3/10; C08L 79/08
[52] U.S. Cl. ........................ 524/413; 524/435; 524/436
[58] Field of Search ................... 524/413, 435, 524/436

[56] References Cited

U.S. PATENT DOCUMENTS

| | | | |
|---|---|---|---|
| 5,042,059 | 8/1991 | Watanabe et al. | 378/145 |
| 5,315,573 | 5/1994 | Nakao et al. | 369/100 |
| 5,670,603 | 9/1997 | Wu et al. | 528/190 |

FOREIGN PATENT DOCUMENTS

| | | |
|---|---|---|
| 2-271933 | 11/1990 | Japan . |
| 2-307832 | 12/1990 | Japan . |
| 3-119326 | 5/1991 | Japan . |
| 3-140035 | 6/1991 | Japan . |
| 3-199137 | 8/1991 | Japan . |
| 7-244305 | 9/1995 | Japan . |

OTHER PUBLICATIONS

The Merck Index, Eleventh Edition, 1989, pp. 415 and 1384.
Journal of American Ceramic Society, 74(1991), pp. 71–76.
Journal of the Chemical Society of Japan, No. 10 (1992), pp. 1,231–1,236.

H. Jerominek, et al. "Cds microcrystallites–doped thin–film glass waveguides" J. Appl. Phys; vol. 63, pp. 957–959, 1988.

M. Nogami, "Preparation and quantum size effect of CuBr microcrystal doped glasses by the sol–gel process", J. Of Non–Crystalline Solids; vol. 134, pp. 71–76, 1991.

M. Nogami, "Cds Microcrystal–doped silica glass prepared by the sol–gel process", J. Of Non–Crystalline Solids; vol. 122, pp. 101–106, 1990.

*Primary Examiner*—James J. Seidleck
*Assistant Examiner*—U. K. Rajguru
*Attorney, Agent, or Firm*—Oliff & Berridge, PLC

[57] ABSTRACT

The present invention provides a non-linear optical material having an excellent non-linear optical effect which is insusceptible to modification of a cuprous halide incorporated therein. The present invention also provides a process which enables the preparation of such a non-linear optical material at a low temperature by means of a simple apparatus. The non-linear optical material of the present invention exhibits a nonlinear response to incident light and comprises a particulate cuprous halide dispersed in a matrix, said particulate cuprous halide having been separated out with the reaction of a functional group contained in a matrix-forming substance having a functional group, wherein said matrix contains a compound for inhibiting the modification of said cuprous halide. The preparation of the non-linear optical material of the present invention can be accomplished by a process which comprises mixing a mixture of a matrix-forming substance having a functional group and a compound for inhibiting the modification of a cuprous halide with a cuprous halide to form a uniform solution, and then allowing said functional group to undergo reaction to form a matrix while causing a particulate cuprous halide to separate out in said matrix.

10 Claims, 4 Drawing Sheets

NON-LINEAR OPTICAL MATERIAL AND PROCESS FOR THE PREPARATION THEREOF

FIELD OF THE INVENTION

The present invention relates to a non-linear optical material comprising a particulate semiconductor having a non-linear optical effect dispersed therein and a process for the preparation thereof. More particularly, the present invention relates to a non-linear optical material comprising a particulate cuprous halide dispersed as a deposit in an organic high molecular (weight) compound or a mixed medium containing an organic high molecular compound and a process for the preparation thereof.

BACKGROUND OF THE INVENTION

With the development of data processing, the research and development of materials having a high non-linear optical effect are under way for the purpose of realizing optical logical element, optical switch, etc. as a basic technique for optical computer. As non-linear optical materials there have heretofore been known an inorganic ferroelectric material such as $LiNbO_3$, $BaTiO_3$ and $KH_2PO_4$, a quantum well semiconductor made of GaAs or the like, an organic single crystal such as 4'-nitrobenzylidene-3-acetamino-4-methoxyaniline (MNBA) and 2-methyl-4-nitroaniline (MNA), a conjugated organic high molecular compound such as polydiacetylene and polyarylene vinylene, and semiconductor particle-dispersed glass having Cds, CdSSe, etc. dispersed in glass.

Extensive studies have been made of semiconductor particle-dispersed glass as a favorable non-linear optical material having a high non-linear optical susceptibility and a high response in combination since Jain and Lind found in 1983 that a so-called color glass filter having finely divided semiconductor particles dispersed in glass exerts a high tertiary non-linear optical effect (as disclosed in J. Opt. Soc. Am., 73, 647 (1983)).

The preparation of this type of glass is normally accomplished by a so-called melt quenching process which comprises heat-melting a mixture of glass or its starting material as a dispersant and a metal or semiconductor powder to prepare a molten glass, casting the molten glass onto a metal plate or the like so that it is rapidly cooled to the vicinity of room temperature to obtain a supercooled glass solid solution having elements constituting a semiconductor dissolved therein as ions, and then subjecting the solid solution to heat treatment at a proper temperature for a predetermined period of time to cause the precipitation of a particulate semiconductor.

However, this melt quenching process requires heating of a semiconductor material to a temperature as high as not lower than 1,000° C., causing the decomposition and evaporation of the semiconductor material. Thus, the kind of the semiconductor to which this melt quenching process can be applied and the amount of the semiconductor which can be added are limited, giving an obstacle to the realization of a material having a higher non-linear optical effect for practical use.

As another process there has been proposed a process which comprises sputtering a polycrystalline single semiconductor such as CdS and CdTe onto glass or $SiO_2$ as a target to prepare a semiconductor particle-dispersed glass (as disclosed in J. Appl. Phys., 63 (3), 957 (1988), JP-A-2-307832 (The term "JP-A" as used herein means an "unexamined published Japanese patent application"), etc.).

As a further process there has been proposed an evaporation or gas phase process which comprises dispersing a particulate semiconductor in a high molecular compound as a matrix other than glass (as disclosed in JP-A-3-119326, JP-A-3-140035, etc.).

These gas phase processes make it possible to dope the matrix with a semiconductor in a larger amount than in the foregoing melt quenching process. However, these gas phase processes require an expensive apparatus regardless of whether the matrix used is inorganic or organic. Further, since these gas phase processes can form a film only at a low speed, it is difficult to form a thick film although they can be used to form a thin film. Moreover, since the form of the element thus obtained is limited to thin film, its use is also limited.

As an approach for overcoming these problems there has been proposed a process which comprises allowing a particulate semiconductor or metal to be dispersed and held in a silica gel matrix produced by sol-gel method so that a semiconductor particle-dispersed glass can be prepared at a low temperature.

As such an approach there has been known a method which comprises dispersing a particulate semiconductor previously prepared by CVD method or the like in a solution of a hydrolyzation product of silicon alkoxide (sol), and then gelating the sol so that the particulate semiconductor is solidified in glass (JP-A-2-271933), a method which comprises adding a particulate semiconductor to a sol containing a silane coupling agent or allowing the particulate semiconductor to be precipitated in the sol, and then gelating the sol so that the particulate semiconductor is solidified in glass (JP-A-3-199137), a method which comprises forming a silica gel containing cadmium acetate, and then reacting the cadmium acetate with hydrogen sulfide gas to cause a particulate cadmium sulfide to be precipitated in the silica gel to obtain a semiconductor particle-dispersed glass [transactions of 1989 annual conference of the Ceramic Society of Japan, Session No. 2F20, J. Non-Cryst. Solids, 122, 101 (1990)], etc.

However, if a tetraalkoxysilane commonly used in the prior art sol-gel method is used, the material is subject to cracking at the step of drying the gel. Further, if a thin film is formed on a substrate to prepare an optical element, a sufficient thickness cannot be provided. Accordingly, in order to obtain an element having a sufficient thickness, an approach is employed which comprises applying the material to a substrate to a thickness of about 0.1 $\mu$m, calcining the thin film at a temperature of not lower than hundreds of degrees centigrade, applying the material to the film to a small thickness, and then repeating this procedure until a proper thickness is obtained.

If as the method for dispersing a particulate semiceductor in a silica gel matrix formed by sol-gel method there is used a method which comprises dispersing a particulate semiconductor which has previously been prepared by a separate method in a sol, a step of preparing a particulate semiconductor is needed, complicating the procedure. Further, a particulate semiconductor having a particle diameter of hundreds of nanometers used is remarkably difficult to handle, giving undesirable problems in the production process. Such a particulate material can be easily condensed and thus can be hardly dispersed uniformly in a medium.

JP-A-2-271933 discloses that ultrasonic dispersion or the addition of a surface active agent provides an effective improvement in the dispersion of a particulate material. However, the use of ultrasonic dispersion is disadvantageous in that the condensation of a particulate material is unavoidable during the application and drying when a thin film is formed. Further, the addition of a surface active agent is disadvantageous in that the surface active agent thus added decomposes or volatilizes away during heat treatment, causing the particulate material to be recondensed.

As a countermeasure against the foregoing problem, JP-A-3-199137 proposes that a silane coupling agent be used instead of surface active agent in an attempt to solve the problem of condensation of particulate material. This proposal features that the silane coupling agent acts like a surface active in a sol and is bonded to a matrix upon hydrolyzation. Thus, the silane coupling agent becomes thermally stable and cannot be hardly decomposed. The above cited patent also proposes as an approach for solving the handling problem of particulate semiconductor incorporated in a sol a method which comprises adding a semiconductor material in the form of solution, and then applying a paired ion source solution or reactive gas to the material to produce a particulate semiconductor in a sol. However, this method is disadvantageous in that the particulate material thus precipitated in the solution has difficulties in dispersion, making it difficult to uniformly precipitate a microcrystalline semiconductor having a quantum sizing effect. Thus, the effect of this method leaves something to be desired.

The method which comprises preparing a gel solid containing semiconductor material ions, and then subjecting the gel solid to post-treatment with hydrogen sulfide gas or the like to cause a particulate semiconductor to be precipitated has no problems of complicated regulations on handling of particulate material or no problems of ununiform dispersion but is disadvantageous in that a very toxic gas such as hydrogen sulfide must be used, endangering the workers and hence requiring a complicated procedure for safety. This method comprising a post-treatment for precipitation of a particulate material is advantageous in that it comprises uniformly dissolving in a solution a material soluble in the reaction medium as a material of particulate semiconductor or metal, making it possible to uniformly precipitate the particulate material in the medium but is disadvantageous in that there is no proper solvent depending on the materials used, restricting the concentration of the particulate material which can be added.

The sol-gel method can be effected at a lower temperature than the melt quenching process but requires heating to a temperature as high as about 600° C. Thus, in order to solve the problems of heat decomposition of semiconductor material, a process which can be operated at an even lower temperature has been desired.

On the other hand, various studies have been made also of the particulate semiconductor or metal which exerts a non-linear optical effect. In particular, studies have been made-of the use of a cuprous halide which is expected to exert a high tertiary non-linear optical effect because it produces excitons having a small Bohr diameter and thus exerts a good effect of confining excitons (Journal of Non-Crystalline Solids, 134 (1991), pp. 71–76, Journal of American Ceramic Society, 74 (1991), pp. 238–240, Journal of the Chemical Society of Japan, No. 10 (1992), pp. 1,231–1,236). However, since such a cuprous halide is not dissolved in a silane compound which has heretofore been used as a medium material, such as tetraethoxysilane [$Si(OCH_2CH_3)_4$], the solvent in which the cuprous halide is dissolved is limited. Further, the cuprous halide has a low solubility. Thus, the amount of the cuprous halide which can be uniformly dissolved in the sol is very low. As a result, the particulate material can be precipitated only in a low concentration even in a gel which is the reaction product. In general, the higher the concentration of the particulate material added is, the higher is the non-linear optical effect which can be expected. Thus, a process has been desired which comprises adding a cuprous halide in a high density to obtain a material having a high non-linear optical effect.

Under the foregoing circumstances, the inventors proposed a process for providing a non-linear optical element having a particulate metal or semiconductor dispersed therein in a high density which can be used as a crackless thin film having a sufficient thickness (JP-A-7-244305). In some detail, this process comprises mixing a solution of a matrix-forming substance having a functional group with a metal, semiconductor or precursor thereof to form a uniform solution, and then allowing the functional group to undergo reaction so that a matrix is formed while causing a particulate metal or semiconductor to be precipitated in the matrix.

However, this process has some disadvantages. For example, if a material which is subject to oxidation, such as cuprous halide, is precipitated, it is partly modified by oxidation, decomposition or the like during the heat precipitation process. The resulting product is colored yellow or brown due to absorptions other than absorption by excitons in the cuprous halide. Thus, the product leaves something to be desired in optical properties.

SUMMARY OF THE INVENTION

It is therefore an object of the present invention to provide a non-linear optical material having an excellent non-linear optical effect which is insusceptible to modification of a cuprous halide incorporated therein.

It is another object of the present invention to a preparation process which enables an easy preparation of the foregoing non-linear optical material at a low temperature by means of a simple apparatus.

These and other objects of the present invention will become more apparent from the following detailed description and examples.

The inventors made extensive studies of a material capable of forming a medium for dispersing and holding a particulate cuprous halide therein. As a result, it has been found that the incorporation of a compound for inhibiting the modification of a cuprous halide in a matrix-forming substance makes it possible to produce a non-linear optical material having excellent optical properties. The present invention has thus been worked out.

The present invention concerns a non-linear optical material which exhibits a nonlinear response to incident light, comprising a particulate cuprous halide dispersed in a matrix, the particulate cuprous halide having been separated out with the reaction of a functional group contained in a functional group-containing matrix-forming substance, wherein the matrix contains a compound for inhibiting the modification of the cuprous halide.

The present invention also concerns a process for the preparation of a non-linear optical material which exhibits a non-linear response to incident light, which comprises mixing a mixture of a functional group-containing matrix-forming substance and a compound for inhibiting the modification of a cuprous halide with a cuprous halide to form a uniform solution, and then allowing the functional group to undergo reaction to form a matrix while causing a particulate cuprous halide to separate out in the matrix.

In the present invention, a cuprous halide, a matrix-forming substance such as high molecular and low molecu- lar compound having a functional group and a compound for inhibiting the modification of a cuprous halide are mixed so that the functional group is reacted to cause the precipitation of a cuprous halide which is insusceptible to modification such as oxidation and decomposition.

The term "matrix-forming substance having a functional group" as used herein is meant to indicate a substance which comprises at least one high molecular or low molecular compound having a functional group and one compound for inhibiting the modification of a cuprous halide and eventually forms a matrix. In other words, a matrix-forming substance having a functional group is a substance which forms an inorganic high molecular compound, an organic high molecular compound and a low molecular compound to be contained in the matrix that is finally formed after the reaction of the functional group. It is a substance which forms various components except particulate cuprous halide in the final composition. In order to adjust physical properties such as mechanical properties, refractive index and dielectric constant, the matrix-forming substance may be used in admixture with a high molecular compound free of functional group, etc.

The term "reaction of a functional group" as used herein is meant to indicate a reaction which lessens or eliminates the interaction between the cuprous halide and the functional group to accelerate the precipitation of the cuprous halide. Before the reaction of the functional group, the interaction between the functional group and the cuprous halide is effected to help the dissolution and hence accelerate doping. After the reaction of the functional group, the precipitation of a particulate cuprous halide is accelerated. The kind and reaction of the functional group are not specifically limited so far as the foregoing requirements are satisfied. For example, various reactions disclosed in JP-A-7-244305 may be used. Examples of the functional group to be reacted include carboxyl group, amino group, amide group, and hydroxyl group. Examples of the reaction of the functional group include intramolecular or intermolecular cyclization reaction, condensation reaction, addition reaction and elimination reaction that causes structural change. These reactions are caused by the action of heat or light, or by a chemical treatment in the presence of a catalyst.

These reactions can be roughly divided into some groups: (1) imide ring-forming reaction by heat treatment or chemical treatment, (2) reaction of a functional group such as carboxyl group, amino group, hydroxyl group and carboxylate anhydride group with an isocyanate group or epoxy group, (3) acid-added salt forming reaction by processing an amino compound with an acid, and (4) other reactions.

An embodiment of the non-linear optical material of the present invention will be exemplified hereinafter. This embodiment is a dispersion of a particulate cuprous halide in a matrix comprising a high molecular compound produced by heat curing or chemical treatment, particularly a high molecular compound having a repeating structural unit represented by the following general formula (1), and a compound for inhibiting the modification of the cuprous halide, such as oxidation inhibitor.

(1)

wherein X represents a tetravalent organic group having not less than 2 carbon atoms; and Y represents a divalent organic group having not less than 2 carbon atoms.

The preparation of the non-linear optical material of the present invention can be accomplished by a process which comprises mixing a mixed solution containing a matrix-forming substance having at least a functional group which interacts with a cuprous halide to help dissolve the cuprous halide, e.g., high molecular compound, and a compound for inhibiting the modification of the cuprous halide, e.g., oxidation inhibitor, with a cuprous halide to form a uniform solution, removing the solvent therefrom, and then subjecting the mixture to heat treatment or chemical treatment.

A preferred embodiment of the non-linear optical material of the present invention is produced by a process which comprises subjecting a heat-curable material, particularly a high molecular compound having a repeating structural unit represented by the following general formula (2), to heat treatment or chemical treatment as a matrix-forming substance having a functional group to allow a particulate cuprous halide to be precipitated.

(2)

wherein X represents a tetravalent organic group having not less than 2 carbon atoms; and Y represents a divalent organic group having not less than 2 carbon atoms.

BRIEF DESCRIPTION OF THE DRAWINGS

By way of example and to make the description more clear, reference is made to the accompanying drawings in which.

DETAILED DESCRIPTION OF THE INVENTION

The present invention will be further described hereinafter.

Referring further to the high molecular compound having a repeating structural unit represented by the foregoing general formula (2) to be used herein as a precursor from which the foregoing matrix is produced, X may be exemplified as an organic residue represented by the following structural formula:

(wherein k represents an integer of from 1 to 6)

Y may be exemplified as an organic residue represented by the following structural formula:

(wherein a represents an integer of from 1 to 1,000)

The high molecular compounds thus exemplified can be synthesized from a tetracarboxylic dihydrate having a structure represented by X and a diamine having a structure represented by Y. These high molecular compounds are soluble in a polar organic solvent such as dimethylformamide, dimethylacetamide, n-methylpyrrolidone, dimethyl sulfoxide, dimethyl sulfonamide, m-cresol, p-chlorophenol, dimethyl imidazoline, tetramethylurea, diglyme, triglyme and tetraglyme. Thus, these high molecular compounds may be formed into a film by a coating method such as spin coating and dip coating. These molecular compounds may also be worked into a fiber. These high molecular compounds preferably have an intrinsic viscosity [η] of from 0.1 to 6 dl/g in a solvent such as dimethylacetamide at 30° C. The term "intrinsic viscosity" as used herein is meant to indicate a value determined by extrapolating the relative or reduced viscosity calculated from the measurements of relative viscosity at various polymer concentrations to zero concentration. Further, these high molecular compounds have many amide acid structures as functional groups and thus interact with various inorganic elements and inorganic compounds. Therefore, these high molecular compounds can stably dissolve a metal, a semiconductor or a compound as starting material thereof therein in a relatively high concentration when they are in the form of either solution or solid freed of solvent. Further, when these high molecular compounds are subjected to heat treatment or dipped in a mixture of acetic anhydride and pyridine to undergo chemical treatment, the following reaction occurs. The mixing ratio of acetic anhydride and pyridine in the mixture of solvent is preferably about 1:1 (by volume).

(wherein n represents a polymerization degree)

The heat treatment may be effected at a temperature of from 50° C. to 400° C., preferably from 100° C. to 300° C. As the solvent to be used in the foregoing chemical treatment there may be used a mixture of acetic anhydride, pyridine and benzene, a mixture of acetic anhydride, pyridine and dimethylacetamide or the like besides the above mentioned mixed solvent.

The foregoing dissolution, heat treatment and chemical treatment are preferably effected in vacuo or in an inert atmosphere.

When the foregoing reaction occurs, the amide acid structure contained in the high molecular compound, i.e., matrix disappears, accompanied by the formation of an imide ring structure as well as the precipitation of the dopant dissolved in the high molecular compound, i.e., cuprous halide. In order to adjust the physical properties such as mechanical properties, refractive index and dielectric constant of the matrix, the foregoing high molecular compound may be used in admixture with other high molecular compounds.

As the particulate cuprous halide to be precipitated in the matrix herein there may be used any material which exhibits non-linear optical properties. Examples of such a material include CuCl, CuBr and CuI in the particulate form. Such a material is incorporated in an amount of from 0.01 to 99% by weight, preferably from 0.1 to 95% by weight.

The non-linear optical material of the present invention comprises as a material which exerts a non-linear optical effect a particulate cuprous halide which produces excitons having a small Bohr diameter and thus exerts a good effect of confining excitons. Accordingly, the non-linear optical material of the present invention is expected to exert a great tertiary non-linear optical effect.

The compound for inhibiting the modification of a cuprous halide employable herein is not specifically limited but is preferably a compound which inhibits the modification of a cuprous halide, shows a good solubility in the same solvent as for the matrix-forming substance having a functional group having an interaction with a cuprous halide and exhibits a sufficiently small absorption in the wavelength of light used by itself and heating product, i.e., wavelength range where the cuprous halide exerts a great non-linear optical effect.

Examples of such a compound include various oxidation inhibitors such as quinone (e.g., hydroquinone), phenol (e.g., BHT (2,6-di-t-butyl-4-methylphenol), BHA (t-butylhydroxyanisole)) and phosphorous acid ester (e.g., triphenyl phosphate). Further, a synergist which exerts no effect of inhibiting oxidation itself but does in the presence of an oxidation inhibitor, such as ascorbic acid, citric acid and phosphoric acid, or a coloration inhibitor for inhibiting the coloration of an oxidation product of an oxidation inhibitor may be used as well. Other examples of the compound for inhibiting the modification of a cuprous halide include various reducing agents such as lower oxygen acid (e.g., sulfite) and metal salt in the form of low atomic valence (e.g., $FeCl_2$, $SnCl_2$, $CrCl_2$, $VCl_2$). Among these reducing agents, $SnCl_2$ effectively inhibits the modification of a cuprous halide, and its oxidation product $SnO_2$ is colorless. Further, since $SnCl_2$ forms no crystalline particles even after heated, a high transparency can be maintained. Accordingly, $SnCl_2$ can be used as the most effective compound in the present invention.

The compound for inhibiting the modification of a cuprous halide is incorporated in the system in an amount of from 0.01 to 99% by weight, preferably from 0.1 to 95% by weight.

In the process for the preparation of the non-linear optical material of the present invention, the solution preparation step of dissolving a cuprous halide in a solution containing a high molecular compound, the step of applying the solution thus obtained, the step of removing the solvent from the coating, the step of subjecting the high molecular compound to heat treatment or chemical treatment, and other steps are all preferably effected in an inert atmosphere such as nitrogen and argon.

The present invention will be further described hereinafter.

EXAMPLE 1

In a stream of dried nitrogen, 0.498 g of 2,2-bis[4-(4-aminophenoxy)phenyl]hexafluoropropane represented by the following general formula (3) was dissolved in 100 ml of diemthylacetamide to make a complete solution to which 0.431 g of 4,4, '-(hexafluoroisopropylidene)phthalic anhydride represented by the following general formula (4) was then gradually added. Subsequently, in a stream of dried nitrogen, the mixture was slowly stirred while being kept at a temperature of from 10° C. to 15° C. for 1 hour. The mixture was further stirred while being kept at a temperature of from 20° C. to 25° C. for 2 hours to obtain a solution of a high molecular compound represented by the following general formula (5). In the high molecular compound solution was then dissolved 0.28 g of $SnCl_2$ to obtain an almost colorless and transparent solution. To the solution was then added 0.15 g of CuCl. The mixture was then stirred to obtain a light yellowish green transparent solution. The foregoing stirring steps were all effected in an atmosphere of dried nitrogen.

(3)

(4)

(5)

(wherein n' represents an integer of about 300)

Figure 1:
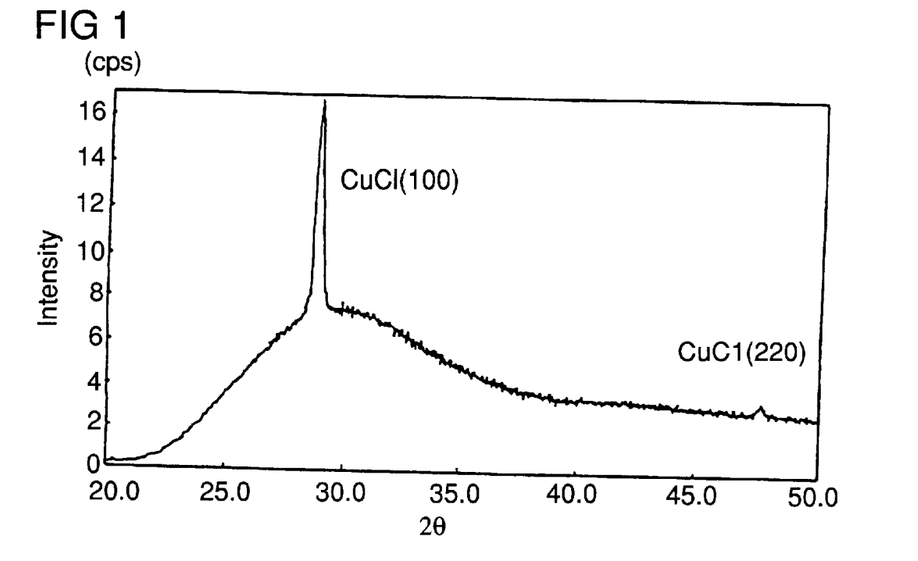
FIG. 1 illustrates X-ray diffraction spectrum of the high molecular compound/CuCl composite film of Example 1 (using CuKα X-ray)

The solution thus obtained was then spin-coated onto a glass substrate in an atmosphere of dried nitrogen to obtain a colorless and transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuCl (see FIG. 1). No crystals other than CuCl were observed precipitated.

Figure 2:
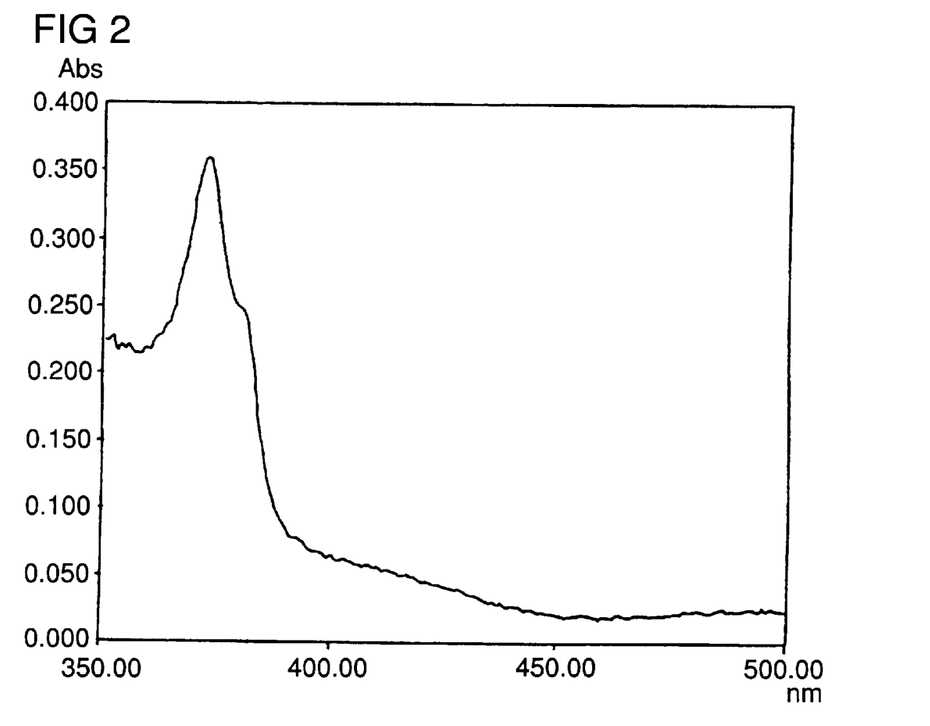
FIG. 2 illustrates the absorption spectrum of the high molecular compound/CuCl composite film of Example 1.

The particle diameter of the precipitate was determined by a transmission electron microscope. As a result, it was confirmed to be from 10 to 50 nm. The high molecular compound/CuCl composite film thus obtained had a sufficiently small precipitate particle diameter and thus was transparent and colorless. The absorption spectrum of the film is shown in FIG. 2. The measurement of absorption spectrum was conducted at room temperature. A $Z_{12}$ exciton absorption sub-band structure of CuCl was definitely observed at 372 nm. A $Z_3$ exciton absorption sub-band structure of CuCl was definitely observed at 380˙nm. As indications of the comparison between absorption by exciton and other undesirable absorptions, the ratio of the absorbance of $Z_{12}$ exciton absorption to the absorbance at 500 nm (Abs (exciton)/Abs (500 nm)), the ratio of the absorbance of $Z_{12}$ exciton absorption to the absorbance at 400 nm (Abs (exciton)/Abs (400 nm)), and the ratio of the absorbance of $Z_{12}$ exciton absorption to the absorbance at 350 nm (Abs (exciton)/Abs (350 nm)) were calculated. The results are set forth in Table 1.

Comparative Example 1

The procedure of Example 1 was followed to prepare a solution of a high molecular compound represented by the foregoing general formula (5). To the high molecular compound solution thus obtained was then added 0.15 g of CuCl. The mixture was then stirred to obtain a bluish green transparent solution. The foregoing stirring steps were all conducted in an atmosphere of dried nitrogen.

Figure 3:
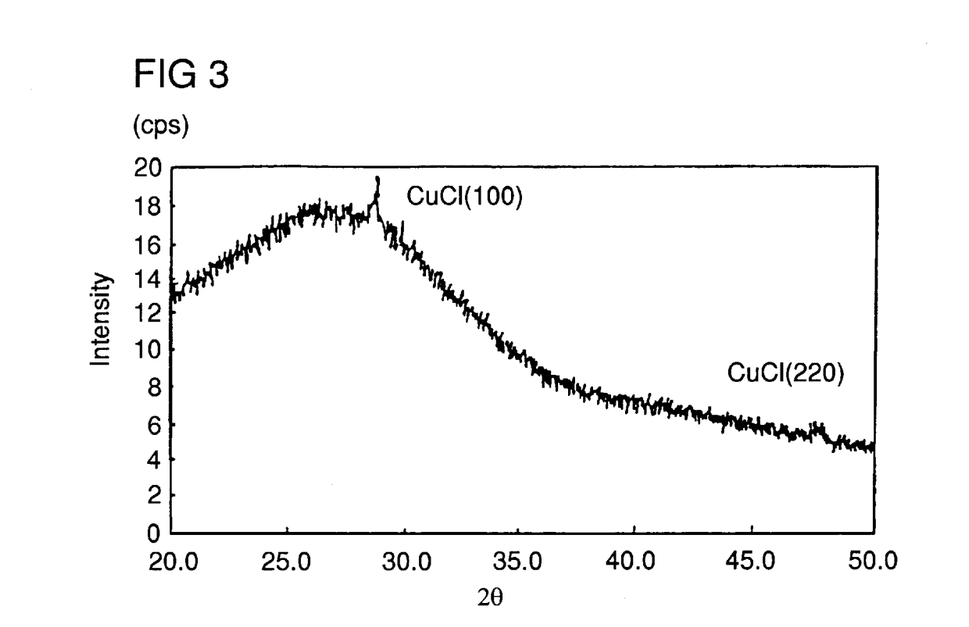
FIG. 3 illustrates X-ray diffraction spectrum of the high molecular compound/CuCl composite film of Comparative Example 1 (using CuKα X-ray)

The solution thus obtained was then spin-coated onto a glass substrate in an atmosphere of dried nitrogen to obtain a light bluish green transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuCl (see FIG. 3). No crystals other than CuCl were observed precipitated.

Figure 4:
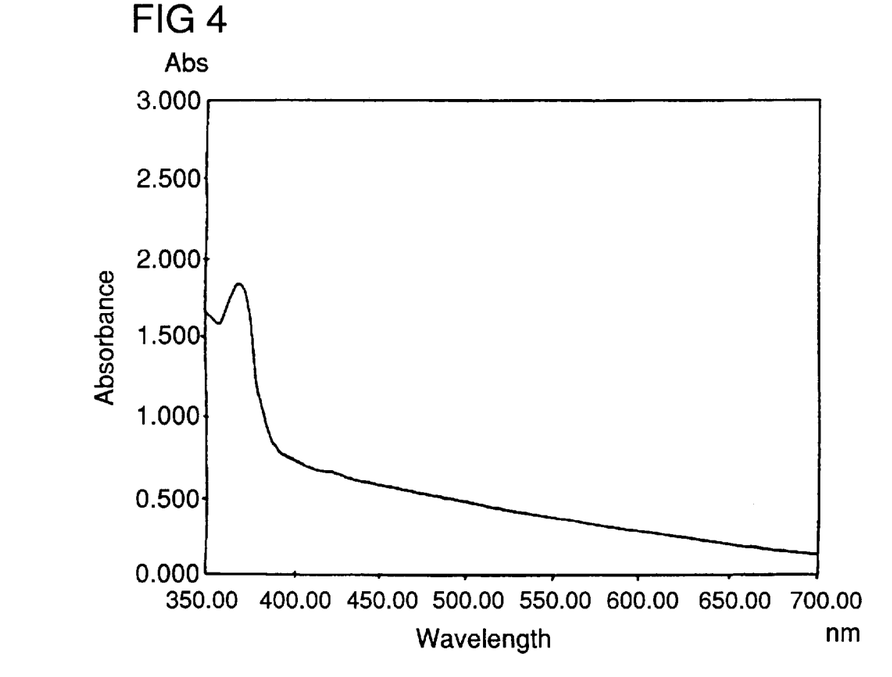
FIG. 4 illustrates the absorption spectrum of the high molecular compound/CuCl composite film of Comparative Example 1.

The particle diameter of the precipitate was determined by a transmission electron microscope. As a result, it was confirmed to be from 10 to 50 nm. The high molecular compound/CuCl composite film thus obtained had a sufficiently small precipitate particle diameter and thus was transparent but observed colored light yellowish brown. The absorption spectrum of the film is shown in FIG. 4. The measurement of absorption spectrum was conducted at room temperature. A $Z_{12}$ exciton absorption sub-band structure of CuCl was definitely observed at 367 nm. A $Z_3$ exciton absorption sub-band structure of CuCl was definitely observed at 380 nm. However, these sub-band structures were observed less definitely than Example 1. Due to a very broad absorption extending to long wavelength side other than exciton absorption, absorption was observed all over the wavelength range where the measurement was conducted. As indications of the comparison between absorption by exciton and other undesirable absorptions, Abs (exciton)/Abs (500 nm), Abs (exciton)/Abs (400 nm), and Abs (exciton)/Abs (350 nm) were calculated as in Example 1. The results are set forth in Table 1. As compared with Example 1, the sample of this comparative example had definitely small such indication values and thus exhibited poor optical properties.

EXAMPLE 2

The procedure of Example 1 was followed to prepare a solution of a high molecular compound represented by the foregoing general formula (5). To the high molecular compound solution thus obtained was then added 0.05 g of BHT (2,6-di-t-butyl-4-methylphenol) to obtain a colorless and transparent solution. To the solution was then added 0.15 g of CuCl. The mixture was then stirred to obtain a light yellowish green solution. The foregoing stirring steps were all conducted in an atmosphere of dried nitrogen.

The solution thus obtained was then spin-coated onto a glass substrate in an atmosphere of dried nitrogen to obtain a colorless and transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuCl. No crystals other than CuCl were observed precipitated. The high molecular compound/CuCl composite film thus obtained had a sufficiently small precipitate particle diameter and thus was transparent and light yellowish. The absorption spectrum of the film was measured at room temperature. As a result, a $Z_{12}$ exciton absorption sub-band structure of CuCl was definitely observed at 372 nm. A $Z_3$ exciton absorption sub-band structure of CuCl was definitely observed at 380 nm. As indications of the comparison between absorption by exciton and other undesirable absorptions, Abs (exciton)/Abs (500 nm), Abs (exciton)/Abs (400 nm), and Abs (exciton)/Abs (350 nm) were calculated as in Example 1. The results are set forth in Table 1.

EXAMPLE 3

The procedure of Example 1 was followed to prepare a solution of a high molecular compound represented by the foregoing general formula (5). In the high molecular compound solution thus obtained was then dissolved 0.05 g of triphenyl phosphite to obtain a colorless and transparent solution. To the solution was then added 0.15 g of CuCl. The mixture was then stirred to obtain a transparent light yellowish green solution. The foregoing stirring steps were all conducted in an atmosphere of dried nitrogen.

The solution thus obtained was then spin-coated onto a glass substrate in an atmosphere of dried nitrogen to obtain a colorless and transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuCl. No crystals other than CuCl were observed precipitated. The high molecular compound/CuCl composite film thus obtained had a sufficiently small precipitate particle diameter and thus was transparent and light yellowish. The absorption spectrum of the film was measured at room temperature. As a result, a $Z_{12}$ exciton absorption sub-band structure of CuCl was definitely observed at 372 nm. A $Z_3$ exciton absorption sub-band structure of CuCl was definitely observed at 380 nm. As indications of the comparison between absorption by exciton and other undesirable absorptions, Abs (exciton)/Abs (500 nm), Abs (exciton)/Abs (400 nm), and Abs (exciton)/Abs (350 nm) were calculated as in Example 1. The results are set forth in Table 1.

TABLE 1

| Example No. | Abs(exciton)/ Abs(500 nm) | Abs(exciton)/ Abs(400 nm) | Abs(exciton)/ Abs(350 nm) |
| --- | --- | --- | --- |
| Example 1 | 6.8 | 5.67 | 1.48 |
| Example 2 | 11.1 | 1.92 | 1.28 |
| Example 3 | 7.69 | 2.49 | 1.31 |
| Comparative Example 1 | 2.56 | 1.88 | 1.04 |

EXAMPLE 4

The procedure of Example 1 was followed to prepare a solution of a high molecular compound represented by the foregoing general formula (5). In the high molecular compound solution thus obtained was then dissolved 0.28 g of $SnCl_2$ to obtain an almost colorless and transparent solution. To the solution was then added 0.22 g of CuBr. The mixture was then stirred to obtain a transparent light yellowish green solution. The foregoing stirring steps were all conducted in an atmosphere of dried nitrogen.

Figure 5:
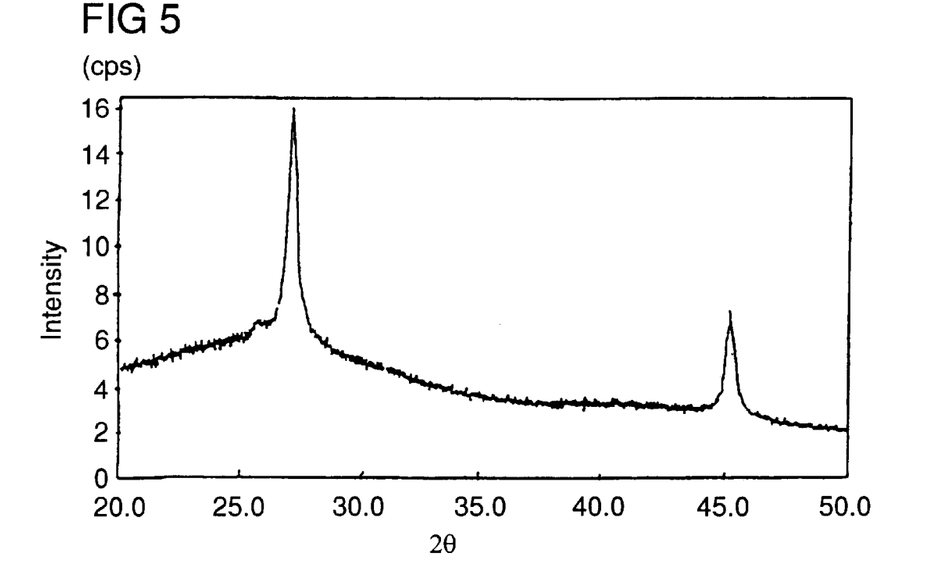
FIG. 5 illustrates X-ray diffraction spectrum of the high molecular compound/CuBr composite film of Example 4 (using CuKα X-ray)
Figure 6:
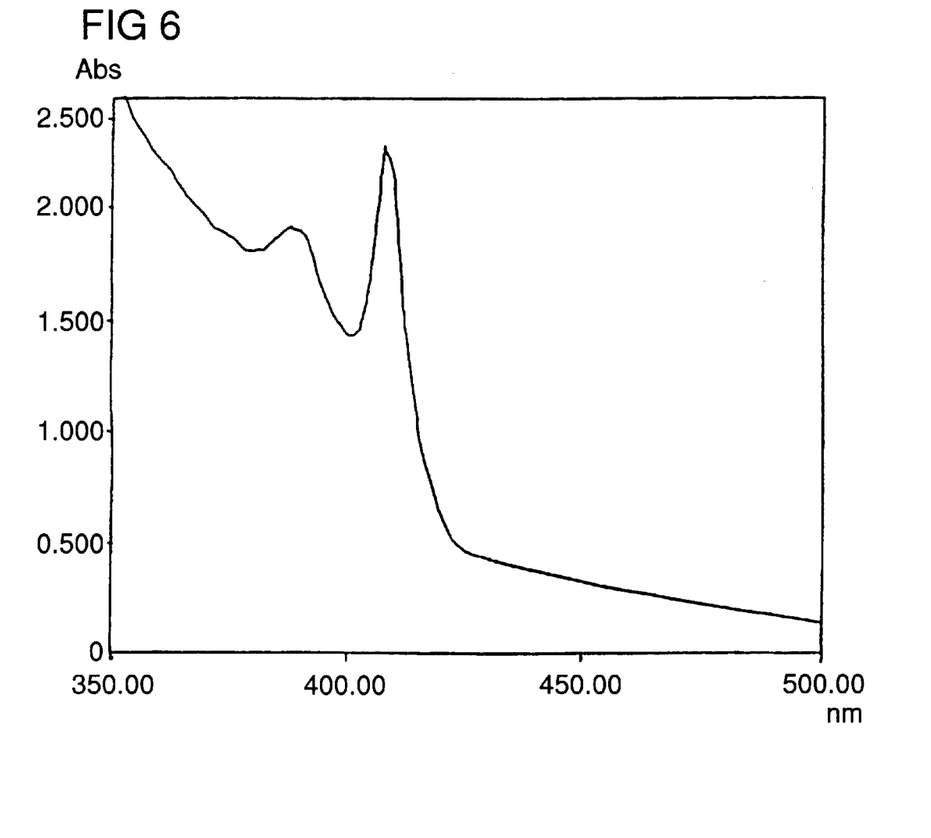
FIG. 6 illustrates the absorption spectrum of the high molecular compound/CuBr composite film of Example 4.

The solution thus obtained was then spin-coated onto a glass substrate in an atmosphere of dried nitrogen to obtain a light yellowish green transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuBr (see FIG. 5). No crystals other than CuCl were observed precipitated. The high molecular compound/CuBr composite film thus obtained had a sufficiently small precipitate particle diameter and thus was transparent and light yellowish. The absorption spectrum of the film is shown in FIG. 6. The measurement of absorption spectrum was conducted at room temperature. As a result, a $Z_{12}$ exciton absorption sub-band structure of CuBr was definitely observed at 410 nm. A $Z_3$ exciton absorption sub-band structure of CuBr was definitely observed at 390 nm. As indications of the comparison between absorption by exciton and other undesirable absorptions, Abs (exciton)/ Abs (500 nm), Abs (exciton)/Abs (450 nm), and Abs (exciton)/Abs (400 nm) were calculated as in Example 1. The results are set forth in Table 2.

Comparative Example 2

The procedure of Example 1 was followed to prepare a solution of a high molecular compound represented by the foregoing general formula (5). To the high molecular compound solution thus obtained was then added 0.22 g of CuBr. The mixture was then stirred to obtain a bluish green transparent solution. The foregoing stirring steps were all conducted in an atmosphere of dried nitrogen.

Figure 7:
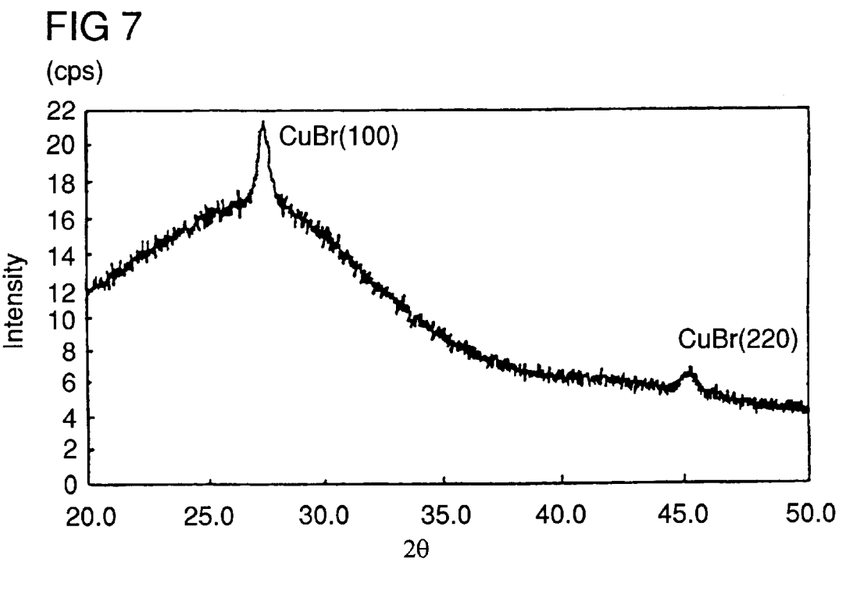
FIG. 7 illustrates X-ray diffraction spectrum of the high molecular compound/CuBr composite film of Comparative Example 2 (using CuKα X-ray)
Figure 8:
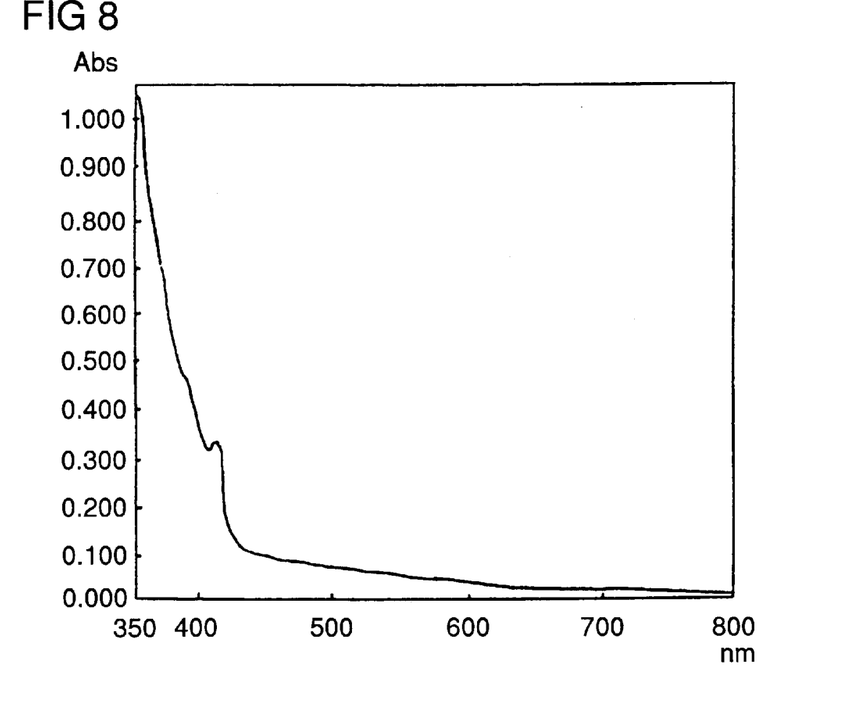
FIG. 8 illustrates the absorption spectrum of the high molecular compound/CuBr composite film of Comparative Example 2.

The solution thus obtained was then spin-coated onto a glass substrate in an atmosphere of dried nitrogen to obtain a light bluish green transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuBr (see FIG. 7). No crystals other than CuBr were observed precipitated. The high molecular compound/CuBr composite film thus obtained had a sufficiently small precipitate particle diameter and thus was transparent but observed colored yellowish brown. The absorption spectrum of the film is shown in FIG. 8. The measurement of absorption spectrum was conducted at room temperature. A $Z_{12}$ exciton absorption sub-band structure of CuBr was definitely observed at 410 nm. A $Z_3$ exciton absorption sub-band structure of CuBr was definitely observed at 390 nm. However, these sub-band structures were observed less definitely than Example 4. Due to a very broad absorption extending to long wavelength side other than exciton absorption, absorption was observed all over the wavelength range where the measurement was conducted. As indications of the comparison between absorption by exciton and other undesirable absorptions, Abs (exciton)/Abs (500 nm), Abs (exciton)/Abs (450 nm), and Abs (exciton)/Abs (400 nm) were calculated as in Example 1. The results are set forth in Table 2. As compared with Example 4, the sample of this comparative example had definitely small such indication values and thus exhibited poor optical properties.

EXAMPLE 5

The procedure of Example 1 was followed to prepare a solution of a high molecular compound represented by the foregoing general formula (5). To the high molecular compound solution thus obtained was then added 0.05 g of BHT (2,6-di-t-butyl-4-methylphenol) to obtain a colorless and transparent solution. To the solution was then added 0.22 g of CuBr. The mixture was then stirred to obtain a light yellowish green solution. The foregoing stirring steps were all conducted in an atmosphere of dried nitrogen.

The solution thus obtained was then spin-coated onto a glass substrate in an atmosphere of dried nitrogen to obtain a colorless and transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuBr. No crystals other than CuBr were observed precipitated. The high molecular compound/CuBr composite film thus obtained had a sufficiently small precipitate particle diameter and thus was transparent and light-yellowish. The absorption spectrum of the film was measured at room temperature. As a result, a $Z_{12}$ exciton absorption sub-band structure of CuBr was definitely observed at 410 nm. A $Z_3$ exciton absorption sub-band structure of CuBr was definitely observed at 390 nm. As indications of the comparison between absorption by exciton and other undesirable absorptions, Abs (exciton)/Abs (500 nm), Abs (exciton)/Abs (450 nm), and Abs (exciton)/Abs (400 nm) were calculated as in Example 1. The results are set forth in Table 2.

EXAMPLE 6

The procedure of Example 1 was followed to prepare a solution of a high molecular compound represented by the foregoing general formula (5). In the high molecular compound solution thus obtained was then dissolved 0.05 g of triphenyl phosphite to obtain a colorless and transparent solution. To the solution was then added 0.22 g of CuBr. The mixture was then stirred to obtain a transparent light yellowish green solution. The foregoing stirring steps were all conducted in an atmosphere of dried nitrogen.

The solution thus obtained was then spin-coated onto a glass substrate in an atmosphere of dried nitrogen to obtain a colorless and transparent film. The film thus obtained was then subjected to heat treatment at a temperature of 250° C. under a pressure of $1 \times 10^{-5}$ torr for 30 minutes. The film thus treated was then examined for the presence of precipitate by X-ray diffractometry. As a result, it was confirmed that the foregoing heat treatment had caused the precipitation of CuBr. No crystals other than CuBr were observed precipitated. The high molecular compound/CuBr composite film thus obtained had a sufficiently small precipitate particle diameter and thus was transparent and light yellowish. The absorption spectrum of the film was measured at room temperature. As a result, a $Z_{12}$ exciton absorption sub-band structure of CuBr was definitely observed at 410 nm. A $Z_3$ exciton absorption sub-band structure of CuBr was definitely observed at 390 nm. As indications of the comparison between absorption by exciton and other undesirable absorptions, Abs (exciton)/Abs (500 nm), Abs (exciton)/Abs (450 nm), and Abs (exciton)/Abs (400 nm) were calculated as in Example 1. The results are set forth in Table 2.

TABLE 2

| Example No. | Abs(exciton)/Abs(500 nm) | Abs(exciton)/Abs(450 nm) | Abs(exciton)/Abs(400 nm) |
| --- | --- | --- | --- |
| Example 4 | 12.80 | 6.76 | 1.54 |
| Example 5 | 9.3 | 6.01 | 1.38 |
| Example 6 | 8.78 | 6.55 | 1.42 |
| Comparative Example 2 | 4.41 | 3.88 | 1.03 |

As mentioned above, the non-linear optical material of the present invention comprises a particulate cuprous halide having a high non-linear optical effect precipitated by the change of a functional group in a matrix, stably dispersed in the matrix in a high concentration without being subject to modification by oxidation or the like. Accordingly, when applied to a substrate to form a thin film, the non-linear optical material of the present invention acts as a crackless non-linear optical element having a sufficient thickness which exerts a high non-linear optical effect. Further, the non-linear optical material of the present invention exerts a high non-linear optical effect and exhibits a high mechanical strength and an excellent optical transparency can be effectively used in the art of optoelectronics. For example, it can be used as an optical switch, optical memory, etc. It can also be used for conversion of wavelength, automatic correction of optical system, optical computing, etc.

In accordance with the preparation process of the present invention, a non-linear optical material can be easily prepared at a low temperature. Further, this preparation process enables the preparation of a functional gel starting with a solution and thus requires no complicated procedure. The gel thus prepared can be easily deformed. Accordingly, the gel can be formed in any shape such as film, tablet, block and fiber.

While the invention has been described in detail and with reference to specific embodiments thereof, it will be apparent to one skilled in the art that various changes and modifications can be made therein without departing from the spirit and scope thereof.

What is claimed is:

1. A non-linear optical material exhibiting a nonlinear response to incident light, which comprises a matrix, a particulate cuprous halide dispersed in the matrix, and a compound contained in the matrix, said compound inhibiting the oxidation of said cuprous halide dispersed in said matrix, which would occur during the separation of said particulate cuprous halide by the reaction of a functional group contained in a matrix-forming substance resulting in discoloration of said optical material.

2. The non-linear optical material according to claim 1, wherein said reaction of a functional group is an imide ring-forming reaction.

3. The non-linear optical material according to claim 1, wherein said compound for inhibiting the modification of cuprous halide is stannous chloride (II).

4. The non-linear optical material according to claim 1, wherein said matrix comprises a high molecular weight compound having a repeating unit represented by the following general formula (1):

(1)

wherein X represents a tetravalent organic group having not less than 2 carbon atoms; and Y represents a divalent organic group having not less than 2 carbon atoms.

5. The non-linear optical material according to claim 1, wherein said compound for inhibiting the modification of a cuprous halide is selected from the group consisting of an oxidation inhibitor and a reducing agent.

6. A process for preparing a non-linear optical material exhibiting a non-linear response to incident light, comprising:

mixing a mixture of a matrix-forming substance having a functional group and a compound with a cuprous halide to form a uniform solution; and then allowing said functional group to undergo a reaction to form a matrix while causing a particulate cuprous halide to separate out in said matrix, wherein said compound inhibiting the oxidation of said particulate cuprous halide in said matrix, which would result in discoloration of said optical material.

7. The process for preparing a non-linear optical material according to claim 6, wherein said reaction of a functional group is an imide ring forming reaction.

8. The process for preparing a non-linear optical material according to claim 6, wherein said compound for inhibiting the modification of cuprous halide is stannous chloride (II).

9. The process for preparing a non-linear optical material according to claim 6, wherein said matrix comprises a high molecular weight compound having a repeating unit represented by the following general formula (1):

(1)

where X respresents a tetravalent organic group having not less than 2 carbon atoms; and Y represents a divalent organic group having not less than 2 carbon atoms.

10. The process for preparing a non-linear optical material according to claim 6, wherein said compound for inhibiting the modification of a cuprous halide is selected from the group consisting of an oxidation inhibitor and a reducing agent.

* * * * *